Figure 3:
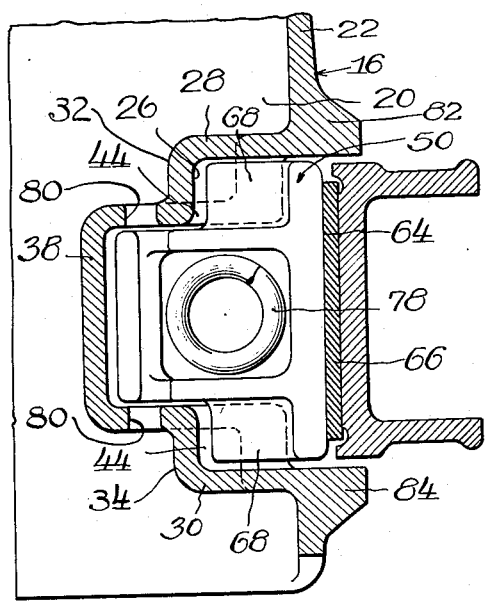

June 19, 1945.   D. M. LIGHT   2,378,415
CAR TRUCK
Filed April 5, 1943   4 Sheets-Sheet 1
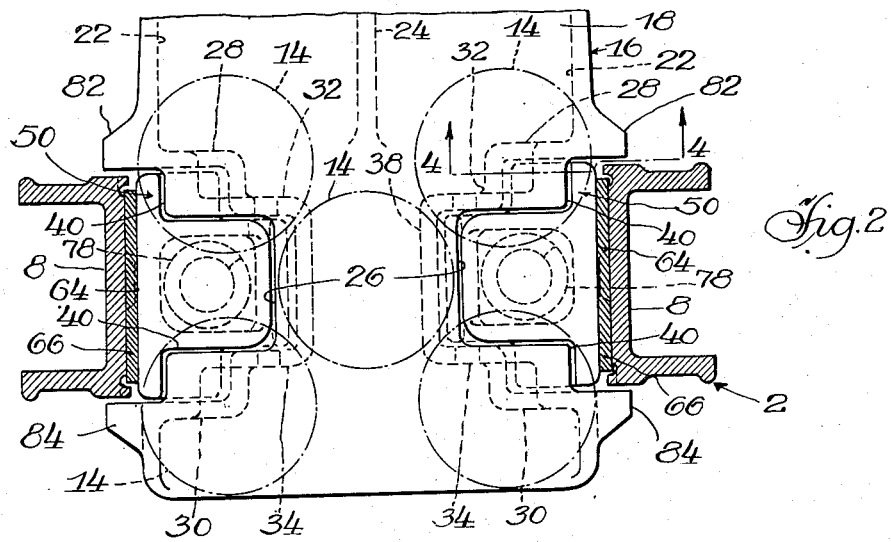
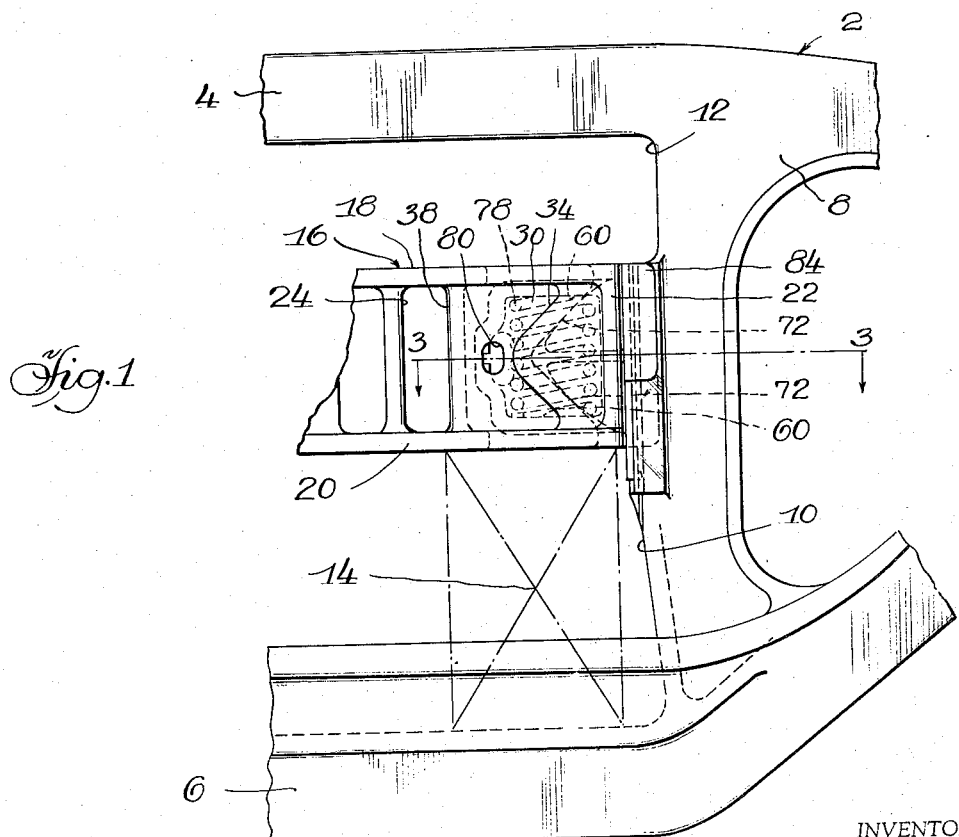
INVENTOR.
David M. Light
BY Ann O. Farner
Atty.

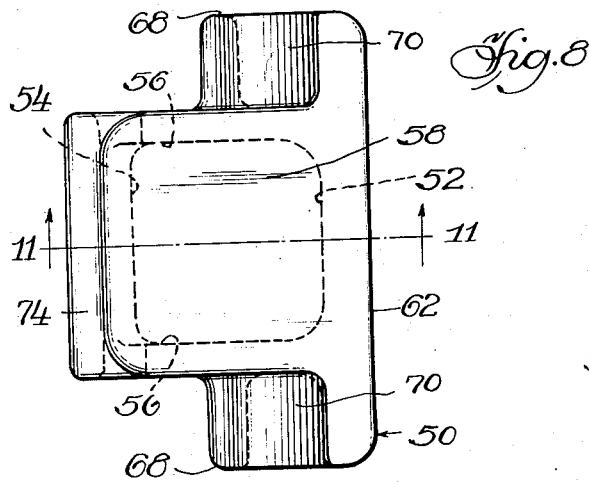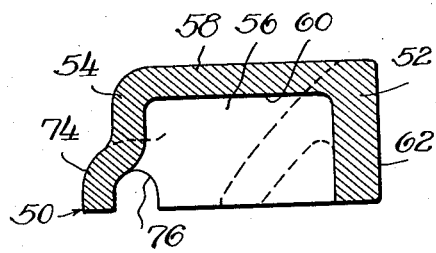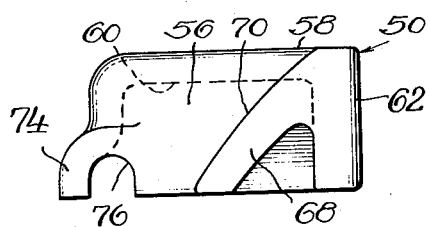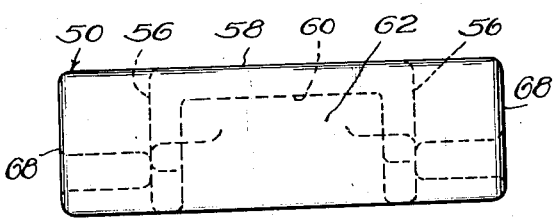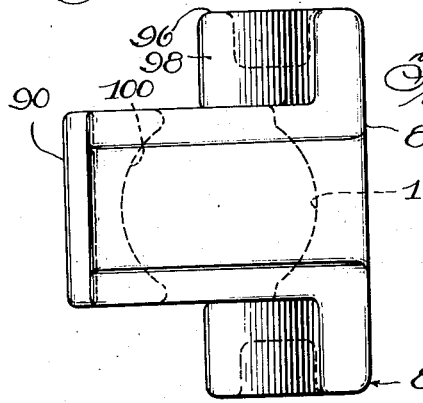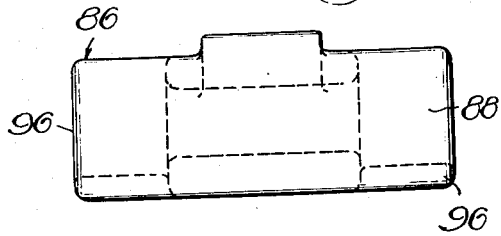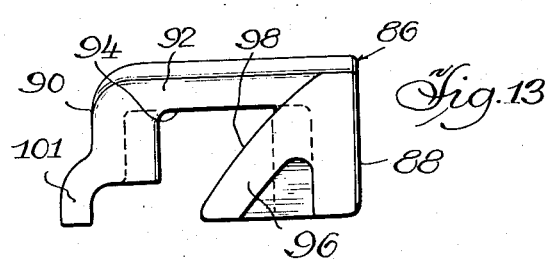

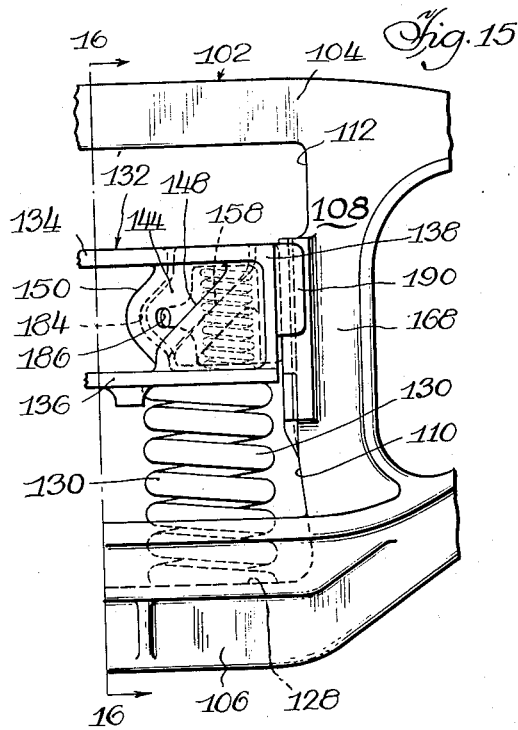
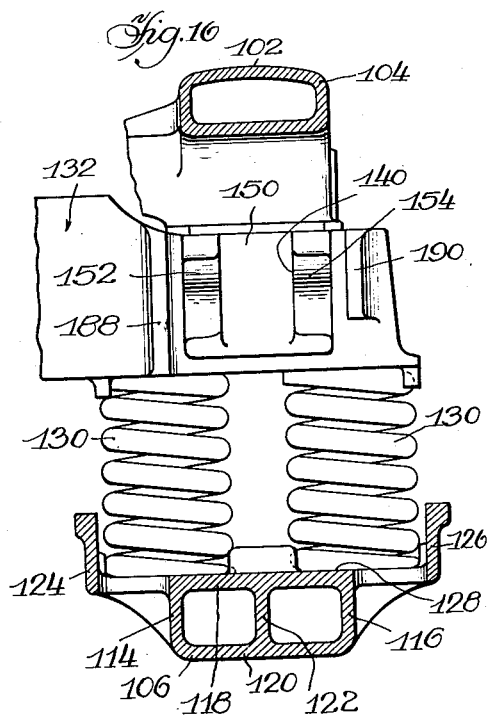
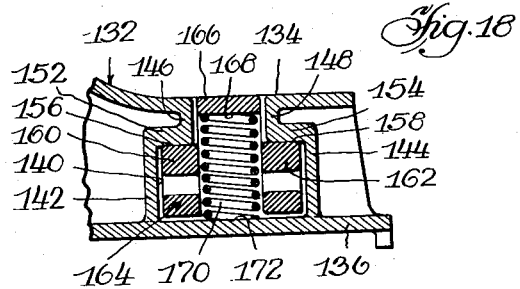
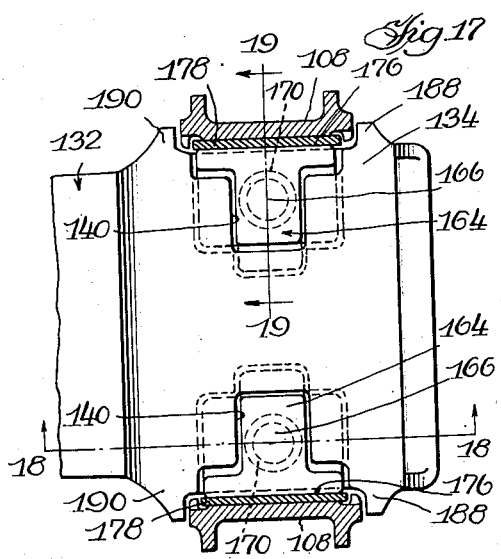
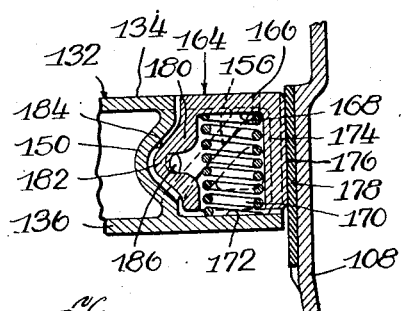

Patented June 19, 1945

2,378,415

UNITED STATES PATENT OFFICE 2,378,415

CAR TRUCK

David M. Light, Chicago, Ill., assignor to American Steel Foundries, Chicago, Ill., a corporation of New Jersey Application April 5, 1943, Serial No. 481,794

30 Claims. (Cl. 105—197)

My invention relates to railway car trucks and more particularly to a type of truck commonly designated ride control wherein friction absorbing means is associated with the truck bolster in such manner as to dampen the oscillations of the bolster supporting spring group.

An object of my invention is to design a ride control truck wherein one or more friction shoes may be housed in each side of the bolster in wedge engagement therewith, said shoes being resiliently urged into said wedge engagement and into frictional engagement with the adjacent side frame columns. In one modification of my invention a pair of friction shoes are housed in each side of the bolster with a resilient member compressed therebetween and in another modification of my invention a single shoe is housed in each side of the bolster with a resilient member compressed between a wall of said bolster and said shoe.

Still another object of my invention is to design a ride control truck such as above described wherein each end of the bolster is provided at opposite sides thereof with column guide lugs for engagement with inboard and outboard surfaces of the associated side frame columns, the outboard of said lugs being of less depth than the widened upper portion of the bolster opening defined by said columns, whereby the bolster may be elevated in said bolster opening and removed therefrom during a quick wheel change.

A further object of my invention is to provide a novel wedge engagement between each friction shoe and the bolster whereby the resilient means associated with said shoe is interposed between spaced wedge surfaces on the shoe and on the bolster.

My invention comprehends a friction shoe of novel form, said shoe being of cup-like shape with an internal spring seat and crowned wedge surfaces at opposite sides thereof, said shoe having a friction face at one end thereof and a handle-like portion at the opposite end thereof.

In the drawings,

Figure 1 is a fragmentary side elevation of a railway car truck embodying my invention, only one end of the truck being shown inasmuch as the same is similar at opposite ends thereof, and Figure 2 is a fragmentary top plan view of the truck with the side frame columns shown in section.

Figure 4:
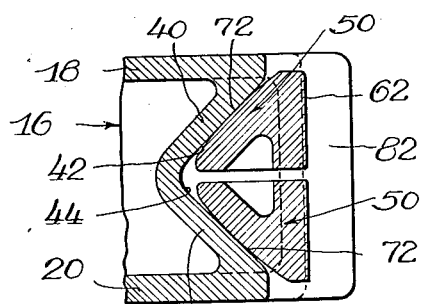

Figures 3 and 4 are respectively sectional views taken in the planes indicated by the lines 3—3 of Figure 1 and 4—4 of Figure 2.

Figure 5:
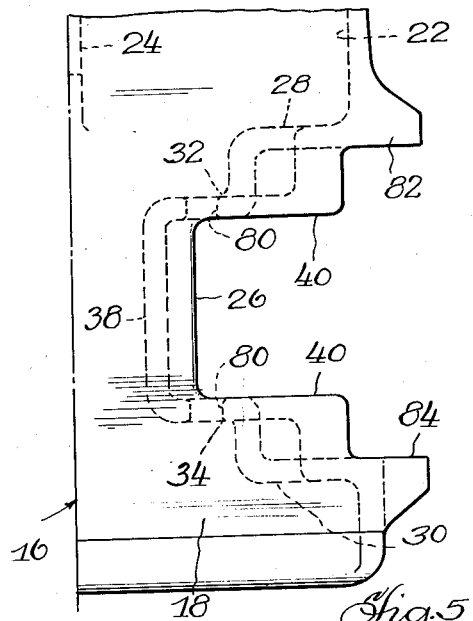
Figure 6:
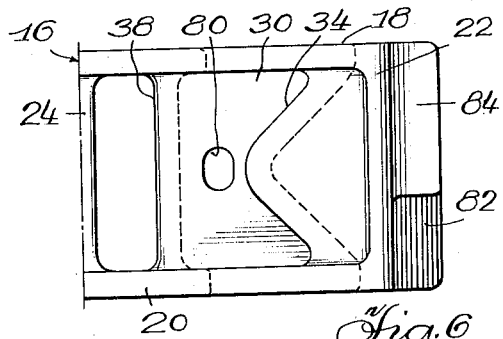
Figure 7:
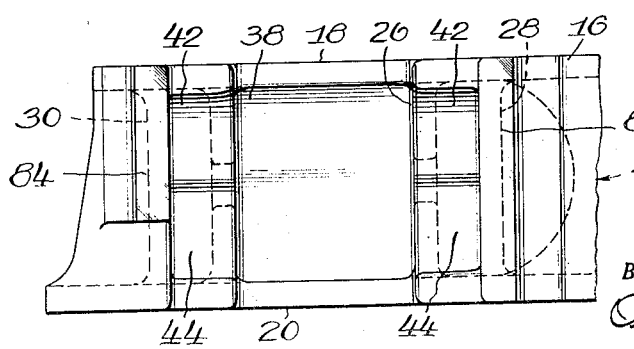

Figures 5 to 7 inclusive show in detail the novel bolster utilized in Figures 1 to 3, Figure 5 being a fragmentary top plan view of the bolster, Figure 6 being a front elevation taken from the bottom as seen in Figure 5, and Figure 7 being a side elevation taken from the right as seen in Figure 5.

Figures 8 to 11 inclusive show in detail one embodiment of my novel friction shoe, Figure 8 being a plan view thereof, Figure 9 being a side elevation taken from the bottom as seen in Figure 8, Figure 10 being a front elevation taken from the right as seen in Figure 8, and Figure 11 being a sectional view taken in the plane indicated by the line 11—11 of Figure 8.

Figures 12 to 14 inclusive show a modified form of my novel friction shoe, Figure 12 being a plan view thereof, Figure 13 a side elevation taken from the bottom as seen in Figure 12, and Figure 14 being a front elevation taken from the right as seen in Figure 12.

Figures 15 to 19 inclusive show a modification of my novel truck, Figure 15 being a fragmentary side elevation thereof, Figure 16 being a sectional view taken in the transverse vertical plane indicated by the line 16—16 of Figure 15, with the bolster shown in elevation, Figure 17 being a top plan view of the truck with the side frame shown in section, and Figures 18 and 19 being respectively sectional views taken on the lines 18—18 and 19—19 of Figure 17.

Describing my invention in detail and referring first to the modification shown in Figures 1 to 14 inclusive, the truck comprises a side frame generally designated 2 and having tension and compression members 4 and 6 merging adjacent each end thereof with a column 8 defining therewith a bolster opening 10 (Figure 1) with a widened upper portion 12. A plurality of springs diagrammatically indicated at 14, 14 (Figures 1 and 2) are seated on the tension member 6 in the customary manner and afford support for a bolster generally designated 16, said bolster comprising top and bottom walls 18 and 20, spaced side walls 22, 22 and the intermediate rib 24 parallel with said side walls.

Each side of the bolster comprises a pocket 26 defined in part by inboard and outboard webs 28 and 30, said webs being inwardly offset at 32 and 34 respectively to define a narrowed inner portion of said pocket, the offset portions 32 and 34 merging with a rear wall 38 extending substantially parallel to the side walls 22, 22 and the rib 24. Integrally formed with each of said webs 28 and 30 is a ledge 40 substantially V-shaped in vertical cross-section, as best seen in Figure 4, and projecting into the pocket 26 to afford top and bottom wedge surfaces 42 and 44 sloping respectively upwardly and downwardly toward the adjacent column 8. Thus it will be apparent that integrally formed with the bolster within each pocket 26 is a pair of spaced internal upper wedge surfaces 42, 42 sloping upwardly toward the adjacent column 8 and a pair of spaced internal lower wedge surfaces 44, 44 sloping downwardly toward said column, each pair of surfaces 42, 42 and 44, 44 cooperating with a single friction shoe as hereinafter more fully described.

A pair of identical friction shoes 50, 50 are positioned within each pocket 26, one of said shoes being shown in detail in Figures 8 to 11 inclusive. Each shoe is a casting of generally cup-like form, having front and rear walls 52 and 54, spaced side walls 56, 56, and an integral web 58 affording an internal spring seat at 60 (Figures 1 and 11). The front wall 52 is formed with a friction face 62 for frictional engagement as at 64 (Figures 2 and 3) with a wear plate 66 conveniently secured to the adjacent column 8 in the customary manner, and the side walls 56, 56 of the friction shoe 50 are formed with wing-like ledges 68, 68 having the substantially co-planar wedge surfaces 70, 70 for complementary wedge engagement at 72, 72 with the associated surfaces 42, 42 or 44, 44 within the pocket 26. It may be noted as best seen in Figures 4 and 9 that the wedge surfaces 70, 70 are crowned from the top to bottom thereof in order to afford a rocking movement of the shoe against the associated surfaces 42, 42 or 44, 44 in order to accommodate irregularities in the frictional engagement between the shoe and the column-mounted wear plate 66. The rear wall 54 of each shoe is provided with an offset handle-like portion 74 and the side walls 56, 56 of the shoe are cored away at 76, 76 in alignment with the inner surface of said handle-like portion to accommodate the reception of an associated tool as hereinafter more fully described.

It will be understood from a consideration of Figures 1 and 4 that a pair of shoes 50, 50 are disposed within each pocket 26, the wedge surfaces 70, 70 on the top shoe being engaged with the surfaces 42, 42 at opposite sides of the pocket, and the wedge surfaces 70, 70 on the bottom shoe being engaged with the complementary wedge surfaces 44, 44 at opposite sides of said pocket. A spring 78, herein illustrated as a coil spring, is interposed between the shoes 50, 50 and is seated at opposite ends against the spring seats 60, 60 within the respective shoes, both of the shoes being urged by said spring and the associated bolster wedge surfaces into frictional engagement at 64 with the adjacent column mounted wear plate 66 as above described.

It may be noted that the offset portions 32 and 34 of the inboard and outboard walls 28 and 30 defining each pocket 26 are provided with aligned openings 80, 80 therethrough and it will be readily understood that a tool may be inserted through the aligned openings 80, 80 in engagement with the handle-like portions 74, 74 of the friction shoes 50, 50, whereby said shoes may be drawn into the pocket 26 against the resistance of the spring 78 during assembly and disassembly of the bolster and the side frame.

It may also be noted that the bolster is provided at each side thereof with inboard and outboard column guide lugs 82 and 84, the outboard lugs 84, 84, as may be clearly seen from a consideration of Figure 1, being of less depth than the widened portion 12 of the bolster opening whereby after the friction shoes have been withdrawn from engagement with the wear plates 66, 66 by means of a tool extending through the openings 80, 80 as above described, the bolster may be elevated in the bolster opening and removed therefrom while the supporting coil springs 14, 14 remain in normal assembled relationship with the side frame.

A modification of my novel friction shoe is shown in Figures 12 to 14 inclusive wherein the shoe, generally designated 86, comprises the front and rear walls 88 and 90 and the integral web 92 affording an internal spring seat 94. The shoe 86 is formed at opposite sides thereof with wing portions 96, 96 formed with the crowned wedge surfaces 98, 98, the front and rear walls 88 and 90 being provided on the adjacent sides thereof with arcuate spring positioning surfaces 100, 100. The rear wall 90 is provided with an offset handle-like portion 101. It will be understood that the friction shoe shown in Figures 12 to 14 inclusive is somewhat skeletal in form but is otherwise substantially identical with that shown in Figures 8 to 11 inclusive.

A modification of my novel truck arrangement is shown in Figures 15 to 19 inclusive wherein the side frame, generally designated 102, comprises tension and compression members 104 and 106 merging adjacent corresponding ends thereof with columns 108, 108, defining therewith the bolster opening 110 with a widened upper portion 112 (Figure 15). The tension member beneath the bolster opening is of box section with the inboard and outboard webs 114 and 116 and the top and bottom chords 118 and 120 as well as the vertical reinforcing rib 122 disposed intermediate the walls 114 and 116. The top chord 118 is widened and formed with upstanding inboard and outboard flanges 124 and 126 defining a spring seat 128 upon which are seated a plurality of coil springs 130, 130 affording support for the bolster generally designated 132.

The bolster comprises the top and bottom walls 134 and 136 and the spaced side walls 138, 138, and a pocket 140 is formed in each side of the bolster, said pocket being defined in part by the inboard and outboard walls 142 and 144 offset respectively at 146 and 148 and merging with a rear wall 150 at the inner end of the pocket. Integrally formed with the inboard and outboard walls 142 and 144 are the spaced ledges 152 and 154, said ledges presenting wedge surfaces sloping upwardly and outwardly toward the adjacent column and engaged at 156 and 158 respectively with wing portions 160 and 162 of a friction shoe generally designated 164, said shoe comprising a top wall 166 affording a seat at 168 for the upper end of a spring 170, the lower end of said spring being seated at 172 against the bottom wall 136 of the bolster.

Each friction shoe 164 also comprises a front wall 174 for engagement at 176 with a wear plate 178 mounted on the adjacent column 108, and said shoe also comprises a rear wall 180 offset at 182 to form a handle-like loop received within a complementary offset 184 in the rear wall 150 of the pocket 140, the loop 182 being aligned with openings 186, 186 in the inboard and outboard walls 142 and 144. It will be understood that, as in the previous embodiment, a tool may be inserted into the openings 186, 186 and may be engaged with the offset portion 182 of the wall 180 whereby the shoe may be withdrawn from engagement with the associated wear plate 178 during assembly and disassembly of the bolster and side frame.

As may be seen in Figures 15 and 19, the surfaces on the shoes are crowned from top to bottom thereof as in the previous modification and for a similar purpose. It may be noted that the bolster 132 comprises inboard and outboard guide lugs 188 and 190 at each side thereof for engagement with the inboard and outboard surfaces of the adjacent column 108, the outboard lugs 190, 190, as may be clearly seen in Figure 15, being of less depth than the widened portion 112 of the bolster opening, whereby the bolster may be elevated therein and removed therefrom during a quick wheel change without disturbing the supporting springs 130, 130.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a railway car truck, a side frame having spaced columns and an intervening bolster opening, resilient means on said frame in said opening, a bolster supported from said means and having pockets in opposite sides thereof, two pairs of wedge surfaces on said bolster in each pocket, top and bottom friction shoes in each pocket in complementary engagement with respective pairs of said wedge surfaces and in frictional engagement with the adjacent column, and a substantially vertical resilient member in each pocket compressed by and between the associated shoes, said bolster opening having a widened upper portion and said bolster having inboard and outboard guide lugs engaging inboard and outboard surfaces on said columns, the outboard guide lugs being of less depth than the widened portion of said bolster opening whereby the bolster may be elevated therein and removed therefrom during a quick wheel change, the wedge surfaces of each of said pairs thereof being disposed at opposite sides of the associated resilient member.

2. In a railway car truck, a side frame having spaced columns and an intervening bolster opening, resilient means on said frame in said opening, a bolster supported on said resilient means and having a pocket in each side thereof, each of said pockets having a pair of spaced upper wedge surfaces sloping upwardly toward the adjacent column, and a pair of spaced lower wedge surfaces sloping downwardly toward said column, a pair of friction shoes in each pocket, each of said shoes engaging the adjacent column and comprising a pair of wedge faces engaging one pair of said wedge surfaces, and a resilient member compressed by and between said shoes and extending between the spaced wedge faces of each shoe, said bolster opening having a widened upper portion and said bolster having inboard and outboard guide lugs engaging the inboard and outboard surfaces of each column, the outboard guide lugs being of less depth than the widened portion of said bolster opening.

3. In a railway car truck, a side frame, resilient means supported from said frame, a bolster supported from said resilient means, friction means on said frame, a pocket in each side of said bolster, a plurality of wedge surfaces on said bolster in each pocket, a plurality of friction shoes in each pocket engaging the associated wedge surfaces and the associated friction means, and resilient means compressed by and between the friction shoes in each pocket.

4. In a railway car truck, a side frame comprising spaced columns and an intervening bolster opening, said opening comprising a widened upper portion, a bolster resiliently supported on said frame in said opening, a pocket in each side of said bolster and comprising spaced wedge surfaces sloping toward the adjacent column, a friction shoe in each pocket having spaced wedge faces in engagement with the spaced wedge surfaces therein, said shoe being in frictional engagement with the adjacent column, resilient means bearing against each shoe and extending between the spaced wedge faces thereon and between the associated wedge surfaces, and inboard and outboard lugs on said bolster guidably engaging the inboard and outboard surfaces of each column, said outboard lugs being of less depth than the widened portion of said bolster opening, whereby said bolster may be elevated therein and removed therefrom during a quick wheel change.

5. In a railway car truck, a side frame having spaced columns and an intervening bolster opening, resilient means on said frame in said opening, a bolster supported on said resilient means and having a pocket in each side thereof defined in part by inboard and outboard substantially vertical walls, each of said pockets having a pair of spaced upper wedge surfaces sloping upwardly toward the adjacent column and a pair of spaced lower wedge surfaces sloping downwardly toward said column, a pair of friction shoes in each pocket, each of said shoes engaging the adjacent column and one pair of said wedge surfaces, and a resilient member compressed by and between each pair of said shoes, each of said shoes having a handle-like portion in alignment with openings in the associated of said inboard and outboard walls.

6. In a railway car truck, a side frame having spaced columns and an intervening bolster opening, resilient means on said frame in said opening, a bolster supported from said means and having pockets in opposite sides thereof, a plurality of wedge surfaces on said bolster in each pocket, top and bottom friction shoes in each pocket in complementary engagement with respective of said wedge surfaces and in frictional engagement with the adjacent column, and a substantially vertical resilient member in each pocket compressed by and between the associated shoes, said bolster opening having a widened upper portion and said bolster having inboard and outboard guide lugs engaging inboard and outboard surfaces on said columns, the outboard guide lugs being of less depth than the widened portion of said bolster opening whereby the bolster may be elevated therein and removed therefrom during a quick wheel change.

7. In a railway car truck, a side frame having spaced columns and an intervening bolster opening, resilient means on said frame in said opening, a bolster supported on said resilient means and having a pocket in each side thereof, each of said pockets having a pair of spaced upper wedge surfaces sloping upwardly toward the adjacent column, and a pair of spaced lower wedge surfaces sloping downwardly toward said column, a pair of friction shoes in each pocket, each of said shoes engaging the adjacent column and comprising a pair of wedge faces engaging one pair of said wedge surfaces, and a resilient member compressed by and between said shoes and extending between the spaced wedge faces of each shoe, said wedge faces being crowned to afford a rocking movement of said shoes against the associated wedge surfaces.

8. In a railway car truck, a side frame having top and bottom members and spaced columns defining therewith a bolster opening, resilient means on said frame in said opening, a bolster supported from said means and having a pocket in each side thereof, each of said pockets having a pair of spaced co-planar wedge surfaces sloping upwardly toward the adjacent column and a pair of spaced co-planar wedge surfaces sloping downwardly toward the adjacent column, a pair of friction shoes in each pocket, each of said shoes engaging the adjacent column and one pair of said wedge surfaces, and resilient means compressed by and between each pair of shoes and extending between the spaced wedge surfaces of each associated pair thereof.

9. In a railway car truck, a side frame having spaced columns and an intervening bolster opening, resilient means on said frame in said opening, a bolster supported on said resilient means and having a pocket in each side thereof, each of said pockets having a pair of spaced upper wedge surfaces sloping upwardly toward the adjacent column and a pair of spaced lower wedge surfaces sloping downwardly toward said column, a pair of friction shoes in each pocket, each of said shoes engaging the adjacent column and one pair of said wedge surfaces, and a resilient member compressed by and between said shoes and extending between the spaced wedge surfaces of each associated pair thereof.

10. In a railway car truck, a side frame having spaced columns and an intervening bolster opening, resilient means on said frame in said opening, a bolster supported on said resilient means and having a pocket in each side thereof, each of said pockets having a pair of spaced upper wedge surfaces sloping toward the adjacent column, and a pair of spaced lower wedge surfaces sloping downwardly toward said column, a pair of friction shoes in each pocket, each of said shoes engaging the adjacent column and comprising a pair of wedge faces engaging one pair of said wedge surfaces, and a resilient member compressed by and between said shoes and extending between the spaced wedge faces of each shoe.

11. In a railway car truck, a side frame comprising spaced columns and an intervening bolster opening, a bolster resiliently supported on said frame in said opening, a pocket in each side of said bolster comprising spaced substantially co-planar wedge surfaces sloping toward the adjacent column, a friction shoe in each pocket having spaced wedge faces in engagement with the spaced wedge surfaces therein, said shoe being in frictional engagement with the adjacent column and said wedge faces being crowned from top to bottom thereof, and resilient means bearing against each shoe and extending between the spaced wedge faces thereon and between the associated wedge surfaces.

12. In a railway car truck, a side frame having spaced columns and an intervening bolster opening, resilient means on said frame in said opening, a bolster supported from said means and having pockets in opposite sides thereof, a plurality of wedge surfaces on said bolster in each pocket, top and bottom friction shoes in each pocket having wedge faces in complementary wedge engagement with respective of said wedge surfaces, said shoes being in frictional engagement with the adjacent column, and a vertical resilient member in each pocket compressed by and between the shoes therein, the wedge faces on said shoes being crowned.

13. In a railway car truck, a side frame having spaced columns and an intervening bolster opening, resilient means on said frame in said opening, a bolster supported from said means and having pockets in opposite sides thereof, a plurality of wedge surfaces on said bolster in each pocket, top and bottom friction shoes in each pocket in complementary engagement with respective of said wedge surfaces and in frictional engagement with the adjacent column, and a substantially vertical resilient member in each pocket compressed by and between the associated shoes, each shoe having a handle-like portion on the side thereof remote from the associated column.

14. In a railway car truck, a side frame comprising spaced columns and an intervening bolster opening, a bolster resiliently supported from said frame in said opening, a pocket in at least one side of said bolster, a V-shaped wall within said pocket presenting opposed wedge surfaces, friction shoes engaged with respective wedge surfaces and with friction means on the adjacent column, and resilient means compressed by and between said shoes.

15. In a railway car truck, a side frame having spaced columns and an intervening bolster opening, resilient means on said frame in said opening, a bolster supported from said means and having pockets in opposite sides thereof, a plurality of wedge surfaces on said bolster in each pocket, top and bottom friction shoes in each pocket in complementary engagement with respective of said wedge surfaces and in frictional engagement with the adjacent column, and a substantially vertical resilient member in each pocket compressed by and between the associated shoes.

16. In a railway car truck, a side frame having spaced columns and an intervening bolster opening, resilient means on said frame in said opening, a bolster supported from said means, a pocket in each side of said bolster, a pair of spaced upper wedge surfaces and a pair of spaced lower wedge surfaces in each pocket, a pair of friction shoes in each pocket, each of said shoes being engaged with the adjacent column and one pair of said wedge surfaces, and a resilient member in each pocket under compression between the associated shoes.

17. In a bolster, a box-like member having top and bottom and spaced side walls, a pocket in each side of said member defined in part by inboard and outboard walls thereof, and a pair of spaced ledges in each pocket merging with said top and bottom and respective of said inboard and outboard walls, each of said ledges being of V-section in vertical cross section and affording top and bottom wedge surfaces within said pocket.

18. In a railway car truck, a side frame comprising spaced columns and an intervening bolster opening, a bolster resiliently supported from said frame in said opening, a pocket in at least one side of said bolster, a V-shaped wall within said pocket presenting opposed wedge surfaces sloping respectively upwardly and downwardly toward the adjacent column, friction shoes engaged with respective wedge surfaces and with friction means on said adjacent column, and resilient means under compression between said shoes.

19. In a railway car truck, a side frame comprising a column member partially defining a bolster opening, a bolster member resiliently supported from said frame in said opening, a pocket in one of said members comprising a plurality of vertically aligned reversely arranged wedge surfaces, spaced friction shoes in said pocket in engagement with respective of said surfaces and in frictional engagement with the other of said members, and resilient means under compression between said shoes.

20. In a railway car truck, a side frame comprising a column member partially defining a bolster opening, a bolster member resiliently supported from said frame in said opening, a pocket in one of said members comprising a plurality of wedge surfaces sloping respectively upwardly and downwardly toward the other of said members, friction shoes in said pocket in engagement with respective of said surfaces and in frictional engagement with said other member, and resilient means compressed by and between said shoes.

21. In a railway car truck, a side frame comprising a column member partially defining a bolster opening, a bolster member resiliently supported from said frame in said opening, a plurality of wedge surfaces on one of said members, said surfaces being reversely arranged and vertically aligned, spaced friction shoes in engagement with respective of said surfaces and in frictional engagement with the other of said members, and resilient means extending between said shoes and under compression therebetween.

22. In a bolster, a box-like member having top and bottom and spaced side walls, a pocket in each side of said member, and wedge surfaces within each pocket sloping respectively upwardly and downwardly toward the outer extremity thereof.

23. In a railway car truck, a side frame comprising spaced columns and an intervening bolster opening, resilient means on said frame in said opening, a bolster supported from said resilient means, wedge surfaces on said bolster at each side thereof, spaced friction shoes at each side of said bolster engaging the associated wedge surfaces thereon and frictionally engaging the adjacent column, and resilient means under compression between the shoes at each side of the bolster.

24. In a railway car truck, a side frame comprising spaced columns and an intervening bolster opening, resilient means on said frame in said opening, a bolster supported from said resilient means, wedge surfaces on said bolster at each side thereof, spaced top and bottom friction shoes at each side of said bolster engaging the associated wedge surfaces thereon and frictionally engaging the adjacent column, and a substantially vertical resilient member compressed by and between the shoes at each side of the bolster.

25. In a bolster, a box-like member having top and bottom and spaced side walls, a pocket in at least one side of said member, and wedge surfaces within said pocket sloping respectively upwardly and downwardly toward the outer extremity thereof.

26. In a bolster, a box-like member comprising top and bottom wedge surfaces on at least one side thereof, said surfaces converging toward the longitudinal center line of the bolster.

27. In a railway car truck, a side frame having a bolster opening, a bolster resiliently supported therefrom within said opening, friction means on said frame in said opening and extending between the top and bottom thereof, wedge surfaces on said bolster diverging toward said friction means, friction shoes engaging respective surfaces and frictionally engaging said friction means, and resilient means compressed by and between said shoes.

28. In a railway car truck, a side frame comprising a column member partially defining a bolster opening, a bolster member resiliently supported from said frame in said opening, a V-shaped web on one of said members having reversely arranged and vertically aligned wedge surfaces diverging toward the other of said members, friction elements engaging respective surfaces and frictionally engaging means on said other member, and resilient means compressed between said elements.

29. In a railway car truck, a side frame comprising a column member partially defining a bolster opening, a bolster member resiliently supported from said frame and said opening, two pairs of friction surfaces on one of said members, friction elements engaging respective surfaces and frictionally engaging friction means on the other member, and resilient means compressed by and between said elements, said resilient means extending between the wedge surfaces of each of said pairs.

30. In a railway car truck, a column member, a relatively movable member supported adjacent thereto, a V-shaped web on one of said members having reversely arranged vertically aligned wedge surfaces diverging toward the other of said members, friction elements engaging said wedge surfaces and engaging friction means on said other member, and resilient means operatively associated with said friction elements for urging the same into engagement with said wedge surfaces and said friction means.

DAVID M. LIGHT.